United States Patent Office 2,979,525
Patented Apr. 11, 1961

2,979,525

NEW CRYSTALLINE PANTOTHENIC ACID ESTER AND PROCESS FOR THE PRODUCTION THEREOF

Ernst Felder and Davide Pitrè, Milan, Italy, assignors to Bracco Industria Chimica S.p.A., Milan, Italy No Drawing. Filed Mar. 31, 1959, Ser. No. 803,075

Claims priority, application Switzerland Apr. 9, 1958

9 Claims. (Cl. 260—482)

The present invention relates to crystalline pantothenic acid menthylester and to a process for its production.

The simple pantothenic acid esters (methyl and ethyl esters) have long been known, see for example Reichstein and Grüssner, Helv. chim. acta 23, 650 (1940). These esters have an action similar to that of pantothenic acid but have the advantage of better fat solubility than pantothenic acid, respectively its salts which are the unique stable forms of pantothenic acid.

The esters so far known have however the great disadvantage that they are oily and consequently are difficult to prepare in pure form. These esters are also fairly unstable, so that so far no practical use has been found for any of the hitherto known pantothenic acid esters.

Also the free pantothenic acid and the pantothenyl alcohol are extremely difficult to handle, primarily on account of their unstable viscous and hygroscopic state. The viscosity of these substances has presented almost insuperable obstacles to its commercial use, since it is nearly impossible to weigh accurately and manipulate its quantities.

It has now surprisingly been found that the pantothenic acid menthyl ester provided by the present invention does not show the disadvantageous properties of the prior known pantothenic acid esters. This ester can, by the process of the invention, obtained in crystalline form, be produced in quite a pure state without any difficulty, has unlimited stability under normal conditions and has an unusually high fat solubility, such as has never been observed with the pantothenyl compounds so far employed. There is thus satisfied an urgent practical need for a solid, fat-soluble and effective pantothenic acid derivative which can be dispensed accurately and can be made into tablets.

The following table shows the comparison of the solubilities of two prior known used pantothenyl derivatives (1 and 2) with the product obtained by the process of the invention (3):

free pantothenic acid, also in a quantitative respect, this being very much in contrast for example to pantothenyl alcohol, which shows only vitamin activity after having been metabolized by the inner organs of man and warm-blooded animals. After dispensing pantothenic acid menthyl ester per os to a mouse, about 95% of the theoretical could again be found in the urine as active pantothenic acid, while this quantity is 80% of the theoretical after intraperitoneal dispensation, while under the same conditions, pantothenyl alcohol, after being dispensed per os, only yields 15% of the theoretical of active pantothenic acid, and 53% of the theoretical after intraperitoneal dispensation.

It was also found that the new pantothenic acid menthyl ester, more especially D-pantothenic acid-L-menthyl ester, has a good therapeutic action in the treatment of catarrhal complaints, especially of the respiratory passages, which effect is mainly to be attributed to the effect of the preparation in promoting expectoration and regeneration of the mucous membrane.

In clinical tests with an ointment containing 5 to 10% of D-pantothenic acid-L-menthyl ester, excellent results were produced in the treatment of bronchitis. The compatibility of the ointments left nothing to be desired, even when used on infants.

The pantothenic acid menthyl ester of the present invention can be used both for therapeutic and cosmetic purposes.

The pantothenic menthyl ester of the present invention is produced from pantolactone. The preferred process is to transform pantolactone directly into the pantothenic acid menthyl ester by reaction with β-alanine menthyl ester. The reaction mixture—obtained by treating pantolactone with β-alanine menthyl ester—is neutralized with a cation exchange resin and the pantothenic acid menthyl ester thus formed is crystallized.

The synthesis of this pantothenic acid menthyl ester can however also take place in several stages, for example by first of all converting pantolactone in a manner known per se into pantothenic acid, converting the latter into any desired mixed pantothenic acid anhydride (for example pantothenic acid azide or pantothenic acid ethoxy carbonate), and finally converting the latter with menthol into pantothenic acid menthyl ester.

The direct esterification of pantothenic acid with menthol is less satisfactory.

With the methods of conversion described above, it is possible to use both D-pantolactone and D,L-pantolactone and on the other hand L-menthol and D,L-menthol or L-menthol and D,L-menthol derivatives. Both the D-pantothenic acid-L-menthyl ester and the D,L-pantothenic acid-D,L-menthyl ester and D,L-pantothenic acid-

TABLE

*Solubility of pantothenyl derivatives in g./100 cc. of solvent at 24° C.*

| | Product | Water | Ethanol | Chloroform | Acetone | Ligroin | Olive oil |
|---|---|---|---|---|---|---|---|
| (1) | Calcium-D-pantothenate | 100 | insoluble | insoluble | insoluble | insoluble | insoluble. |
| (2) | D-Pantothenol | 100 | 100 | do | do | do | Do. |
| (3) | D-Pantothenic acid-L-menthyl-ester | insoluble | 100 | 100 | 100 | 0.5–1 | 6–8. |

Pharmacological investigation has shown that pantothenic acid menthyl ester is a completely non-toxic substance. The $DL_{50}$, determined on a mouse, is 10 g./kg. i.p., while the necessary dose for producing biological activities is very small and is in the region of 5 to 10 mg./kg., from which an unusually good therapeutic index is obtained.

Further investigation has shown that pantothenic acid menthyl ester develops practically the same activity as L-menthyl ester can easily be obtained in crystalline form.

The invention is further illustrated by the following examples:

EXAMPLE 1

5.2 parts by weight of D-pantolactone and 9.08 parts by weight of β-alanine-L-menthyl ester—obtained by usual methods, with very good yields, for example by conversion of phthalyl-β-alanine chloride with L-menthol to phthalyl - β - alanine - L - menthyl ester (M.P. 102° C., $[\alpha]_D^{20°} = -25.6°$ [c.=5% in benzene]) and treatment thereof with hydrazine in amyl alcohol at boiling temperature (B.P. 116 to 119° C./2 mm. Hg, M.P. of the oxalate 191° C.)—are heated for 5 hours at 50° C. while stirring. The vitreous reaction product is taken up in 100 parts by volume of methanol and treated with a cation exchanger, for example with Amberlite JR 120, until added phenolphthalein indicator is decolorized. The resin is now filtered off and the filtrate completely evaporated to dryness. The residue (12 parts, i.e. 85% of the theoretical) consists of practically pure D-pantothenic acid-L-menthyl ester and melts at 64° C., $[\alpha]_D^{20°} = -25°$ (c.=2% in alcohol). For extreme purity, the crude product can be extracted from 50% alcohol with methylene chloride and/or recrystallized with a good yield from a large quantity of hexane. The pure product melts at 68 to 69° C., $[\alpha]_D^{20°} = -24.5°$ (c.=2% in alcohol). D-pantothenic acid-L-menthyl ester is readily soluble in most organic solvents, such as methanol, ethanol, ethylene chloride and benzene, but on the other hand is sparingly soluble in water and cold petroleum ether.

EXAMPLE 2

16.5 parts by weight of D,L-pantolactone and 28 parts by weight of β-alanine-L-menthyl ester are stirred for 5 hours at 50° C.; the substance is then taken up in methanol and adjusted to a pH value of 7.2 by adding 5 parts by weight of Amberlite JR 120. The resin is then filtered off, the solvent evaporated and the residue recrystallized from a large quantity of hexane (seeding). The D,L-pantothenic acid-L-menthyl ester thus obtained melts at 65 to 66° C., $[\alpha]_D^{20°} = -45°$ (c.=2% in alcohol).

EXAMPLE 3

5.60 parts by weight of D,L-pantolactone and 10 parts by weight of β-alanine-D,L-menthyl ester—obtained in analogous manner to the β-alanine-L-menthyl ester (see Example 1), B.P. 114 to 115° C./2 mm. Hg, M.P. of the oxalate 186° C.—are stirred for 5 hours at 50° C., neutralized in methanol with Amberlite JR 120, freed from the solvent, caused to crystallize by drying in vacuo and recrystallized from a large quantity of hexane.

The D,L-pantothenic acid-D,L-menthyl ester thus obtained melts at 91 to 92° C. It is miscible with methanol, ethanol and chloroform, has very good solubility in ethyl acetate, is soluble in ether, but sparingly soluble in water. 2 g. thereof are dissolved in a litre of cold hexane.

The D-pantothenic acid-D,L-menthyl ester is obtained in a manner analogous to that described in the previous examples.

We claim:

1. Crystalline pantothenic acid menthyl ester, the pantothenic acid part being selected from the group consisting of the biologically active D-form and the racemic D,L-form, the menthol part being selected from the group consisting of the biologically active L-form and the racemic D,L-form.

2. D-pantothenic acid-L-menthyl ester.

3. D,L-pantothenic acid-D,L-menthyl ester.

4. D,L-pantothenic acid-L-menthyl ester.

5. D-pantothenic acid-D,L-menthyl ester.

6. A process for the production of crystalline pantothenic acid menthyl ester, which comprises treating pantolactone with β-alanine menthyl ester, neutralizing the reaction mixture with a cation exchange resin and crystallizing the pantothenic acid menthyl ester thus formed.

7. A process for the production of crystalline D-pantothenic acid-L-menthyl ester, which comprises treating D-pantolactone with β-alanine-L-menthyl ester, neutralizing the reaction mixture with a cation exchange resin and crystallizing the D-pantothenic acid-L-menthyl ester thus formed.

8. A process for the production of crystalline pantothenic acid menthyl ester, which comprises heating a mixture of substantially equimolar proportions of pantolactone and β-alanine menthyl ester to about 50° C., neutralizing the reaction mixture by treating same with a cation exchanger, crystallizing the pantothenic acid menthyl ester formed by filtering off the cation exchanger, and evaporating the solvent.

9. A process for the production of crystalline D-pantothenic acid-L-menthyl ester, which comprises heating for several hours a mixture of substantially equimolar proportions of D-pantolactone and β-alanine-L-menthyl ester to about 50° C., taking up the reaction mass obtained in methanol, neutralizing same by treating with a cation exchanger, crystallizing the D-pantothenic acid-L-menthyl ester thus formed by filtering off the cation exchanger, evaporating the solvent, and recrystallizing the product.

References Cited in the file of this patent

UNITED STATES PATENTS 2,557,284     Harris et al.             June 19, 1951